(12) United States Patent
Hequet et al.

(10) Patent No.: US 8,761,330 B2
(45) Date of Patent: Jun. 24, 2014

(54) METHOD OF EVALUATING QUANTITIES RELATING TO THE DISTORTION OF A NUCLEAR FUEL ASSEMBLY

(75) Inventors: Michel Hequet, Belmont d'Azergues (FR); Jean-Christophe Basset, Lyons (FR); Michel Pain, Chalon sur Saone (FR)

(73) Assignee: Areva NP, Courbevoie (FR)

( * ) Notice: Subject to any disclaimer, the term of this patent is extended or adjusted under 35 U.S.C. 154(b) by 523 days.

(21) Appl. No.: 13/122,120

(22) PCT Filed: Sep. 23, 2009

(86) PCT No.: PCT/FR2009/051790
§ 371 (c)(1),
(2), (4) Date: Mar. 31, 2011

(87) PCT Pub. No.: WO2010/037948
PCT Pub. Date: Apr. 8, 2010

(65) Prior Publication Data
US 2011/0182393 A1   Jul. 28, 2011

(30) Foreign Application Priority Data
Oct. 1, 2008   (FR) .................................... 08 56646

(51) Int. Cl.
*G21C 17/00*   (2006.01)

(52) U.S. Cl.
USPC ........................................................ 376/248

(58) Field of Classification Search
USPC ........................................................ 376/248
See application file for complete search history.

(56) References Cited

U.S. PATENT DOCUMENTS

2002/0071513 A1   6/2002   Uckert

FOREIGN PATENT DOCUMENTS

| FR | 27217040 | 12/1995 |
| FR | 2754892 | 4/1998 |
| WO | WO 9714154 | 4/1997 |
| WO | WO 9714154 A1 * | 4/1997 |

* cited by examiner

*Primary Examiner* — Timothy A Brainard
(74) *Attorney, Agent, or Firm* — Davidson, Davidson & Kappel, LLC

(57) ABSTRACT

A method of evaluating at least one quantity relating to the distortion of a nuclear fuel assembly, the method including the following steps: the nuclear fuel assembly is placed in a volume of water bounded by an upper free surface; a camera is placed outside the volume of water, above the free surface; at least one image of at least one lateral face of the nuclear fuel assembly is taken; the at least one image is analyzed graphically and the at least one quantity relating to the distortion of the nuclear fuel assembly is deduced therefrom.

13 Claims, 4 Drawing Sheets

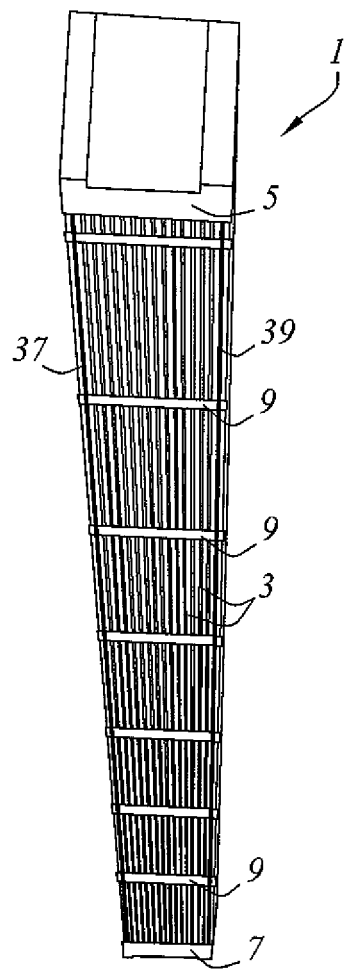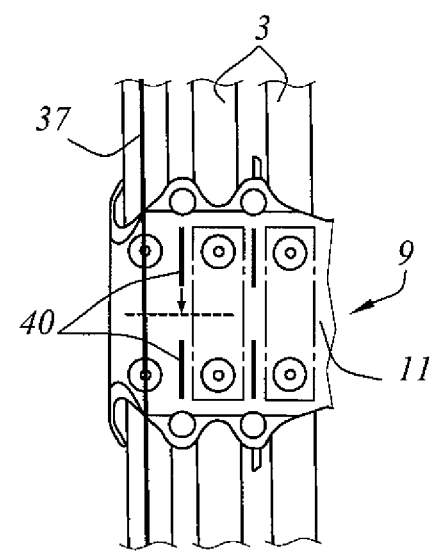
*FIG.5*  *FIG.6*

METHOD OF EVALUATING QUANTITIES RELATING TO THE DISTORTION OF A NUCLEAR FUEL ASSEMBLY

The invention generally relates to a method for evaluating quantities relative to the distortion of a nuclear fuel assembly, in particular the bow and the twist of the assembly.

BACKGROUND

Known from USH1262 is the use of a video surveillance camera or CCTV (closed-circuit television), hardened against radiation, for monitoring the bowing of fuel assemblies. The camera is placed in a sealed housing and is moved vertically, underwater, along the assemblies to be characterized.

Such a monitoring method using an underwater camera is generally long to implement due to the volume and weight of the equipment to be installed, the remotely controlled movement of the camera along the fuel assembly, and the decontamination of the equipment after use.

This monitoring is done for example when a nuclear reactor is stopped, in order to replace some of the nuclear fuel assemblies. All of the assemblies are taken out of the core of the reactor. The spent assemblies are evacuated and replaced with new assemblies. The other assemblies are reorganized inside the core. The assemblies can be subject to distortion monitoring before being evacuated or before being replaced in the core of the reactor. The main purpose of this monitoring is to obtain data on the behavior of the fuel assemblies under radiation.

SUMMARY OF THE INVENTION

These checks are on the critical path when the reactor is stopped in order to replace part of the reactor's fuel.

This, making the method for acquiring distortion data relative to the nuclear fuel assemblies simpler and faster to carry out makes it possible to shorten the period during which the reactor is stopped for reloading.

In this context an object of the invention is to propose a method for evaluating at least one quantity relative to the distortion of a nuclear fuel assembly, that is easy to install and disassemble and faster to implement.

The invention provides a method comprising the following steps:
placing the nuclear fuel assembly in a volume of water bounded by a free upper surface;
placing the camera outside the volume of water, above the free surface;
taking at least one image of at least one lateral face of the nuclear fuel assembly;
graphically analyzing the at least one image and deducing the at least one quantity relative to the distortion of the nuclear fuel assembly therefrom.

The method can also have one or several of the features below, considered individually or according to all technically possible combinations:
the entire lateral face of the nuclear fuel assembly appears in the image taken by the camera;
the nuclear fuel assembly comprises a plurality of longitudinally elongated nuclear fuel rods and a plurality of grids for maintaining the nuclear fuel rods in position, distributed longitudinally along the nuclear fuel rods, the at least one quantity relative to the distortion of the nuclear fuel assembly being the respective shifts of the maintenance grids in a transverse plane perpendicular to the longitudinal direction;
the camera has an optical axis forming an angle between 10° and 40° relative to the vertical at the time of the shot;
the camera and the nuclear fuel assembly are spaced apart from each other when the image is taken by a distance between 1 meter and 4 meters in a horizontal plane;
the nuclear fuel assembly comprises two end maintenance grids situated near opposite ends of the nuclear fuel rods, and a plurality of intermediate maintenance grids distributed between the two end maintenance grids, the step for graphic analysis comprises the following sub-steps:
materializing, on the image, at least one substantially longitudinal reference line extending from one end grid to the other end grid;
determining, on the image, the transverse shift of each intermediate grid relative to the at least one reference line;
the maintenance grids or the fuel rods near the maintenance grids can have respective visual references substantially aligned longitudinally when said maintenance grids are not shifted transversely, the reference line passing through the visual references relative to the two end maintenance grids, the transverse shift of each intermediate maintenance grid being determined by estimating, on the image, the transverse shift between the visual reference relative to said intermediate maintenance grid and the reference line;
at least one image is taken of each of two lateral faces perpendicular to each other of the nuclear fuel assembly, and the respective shifts of the maintenance grids are determined in two directions perpendicular to each other and perpendicular to the longitudinal direction;
the nuclear fuel assembly comprises upper and lower caps, the quantity relative to the distortion of the nuclear fuel assembly being the rotation of the upper and lower caps relative to each other around the longitudinal direction;
the camera presents an optical axis forming an angle between 1° and 10° relative to the vertical when the image is taken;
the camera and the nuclear fuel assembly, when the image is taken, are spaced apart from each other by a distance smaller than 1 meter in a horizontal plane;
the upper and lower caps have determined respective geometric lines normally parallel to each other when the upper and lower caps do not have any rotation relative to each other around the longitudinal direction, the step for graphic analysis of the image comprising the following sub-steps:
determining, in the image, the two geometric lines;
determining, in the image, the relative angle between the two geometric lines;
the camera has a determined optical axis, a shielding widow being placed on the free surface and inserted on the optical axis of the camera.

BRIEF DESCRIPTION OF THE DRAWINGS

Other features and advantages of the invention will emerge from the detailed description provided below, for information and non-limitingly, in reference to the appended figures, in which:

FIG. 5 shows an image taken by the camera of FIG. 3 in order to determine the bowing of a fuel assembly, two reference lines being materialized on either side of the lateral face of the nuclear fuel assembly;

FIG. 6 is an enlarged view of a detail of FIG. 5, showing the transverse shift of a maintenance grid;

DETAILED DESCRIPTION

Figure 1:
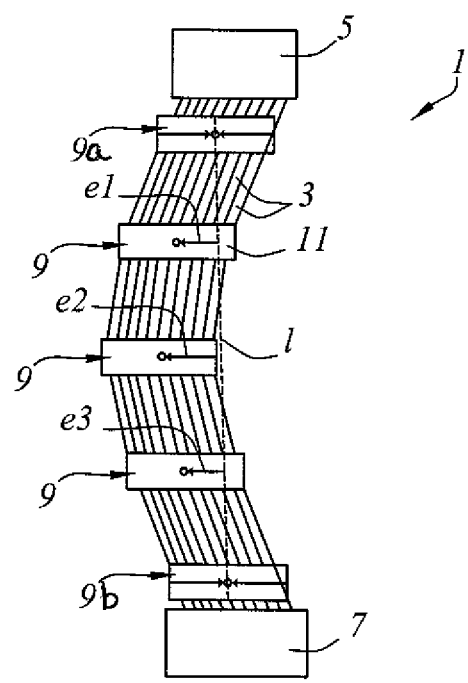
FIG. 1 is a simplified diagrammatic illustration, in elevation, of a fuel assembly having a distortion by bowing.

The method that will be described aims to determine the bow and the twist of nuclear fuel assemblies. As illustrated in a simplified manner in FIGS. 1 and 2, a nuclear fuel assembly 1 for a light water reactor includes a plurality of longitudinally elongated nuclear fuel rods 3, upper and lower caps 5 and 7, and grids 9 for maintaining the rods 3. The rods 3 contain nuclear fuel pellets. They are arranged parallel to each other, following a regular pattern, typically a square pitch pattern. The assembly 1 is generally parallelepiped and then has four lateral faces.

The upper and lower caps 5 and 7 are positioned at the two ends of the assembly 1 and are secured to each other by a plurality of longitudinal tubes. These tubes are for example provided for the passage of the rods from the control cluster of the nuclear reactor.

The grids 9 are rigidly fixed to the tubes securing the two caps 5 and 7. The grids 9, perpendicular to the longitudinal direction, have a square section. They are bounded by four lateral faces 11, perpendicular to each other. The inner space of the grids 9 is divided into a plurality of cells with a generally square-shaped section by an array of internal tabs. Each rod 3 is engaged in one of the cells.

One of the grids 9a, called upper grid in the description that follows, is located near the upper cap 5, close to a longitudinal end of the rods 3. Another grid 9b, called lower grid in the description that follows, is located near the lower cap 7, close to the opposite longitudinal end of the rods 3. The other grids 9 are distributed evenly between the upper and lower grids along the rods 3.

The nuclear fuel assemblies 1 are subjected, in the core of the reactor, to very substantial thermal and mechanical stresses. In the long term, these stresses can cause a distortion of the fuel assemblies, in particular distortion by bowing (FIG. 1) and distortion by twisting (FIG. 2).

The assemblies 1 distorted by bowing assume a general bowed shape, in general a single curve (C-shaped distortion) or with two curves (S-shaped distortion), or even with three curves (M- or W-shaped distortion).

The assemblies 1 have a deflection in a direction substantially perpendicular to the longitudinal direction of the assembly. The deflection is typically several millimeters and can go up to more than ten millimeters.

Figure 2:
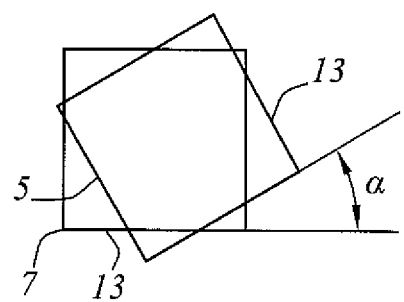
FIG. 2 is a diagrammatic illustration, in top view, of the respective positions of the upper and lower caps of the assembly of FIG. 1, showing the distortion by twisting of the fuel assembly materialized by the rotation of the two caps relative to each other.

As shown in FIG. 1, the shift is more pronounced for the intermediate grids located longitudinally at the center of the assembly when the assembly is C-shaped. These shifts are materialized by the deviations e1, e2 and e3 between the lateral faces 11 and an imaginary line 1 extending from the lower grid 9b to the upper grid 9a.

The shift is more pronounced for the intermediate grids 9 located longitudinally in the upper half or in the lower half of the assembly when the assembly 1 is distorted in an "S" shape.

Distortion by twisting, illustrated in FIG. 2, corresponds to twisting of the whole assembly 1 around a longitudinal axis materialized by a rotation of the upper 5 and lower 7 caps relative to each other. This twisting may or may not be accompanied by a shift of the two caps relative to each other in a transverse plane.

As shown in FIG. 2, the caps 5 and 7 are perpendicular to the longitudinal direction of the square sections, and are laterally bounded by four faces 13 perpendicular to each other. Because of the relative rotation between the two caps, the respective lateral faces 13 of the caps are inclined relative to each other in top view.

The method that will be described below aims to determine:

the transverse shift of each of the intermediate grids 9 relative to the upper and lower grids 9a, 9b, in a transverse plane, along two directions that are perpendicular to each other; and the angle $\alpha$ (FIG. 2) of rotation around the longitudinal direction between the upper 5 and lower 7 caps.

The shift of the grids 9 is measured along two directions perpendicular to two adjacent lateral faces of the assembly 1.

Figure 3:
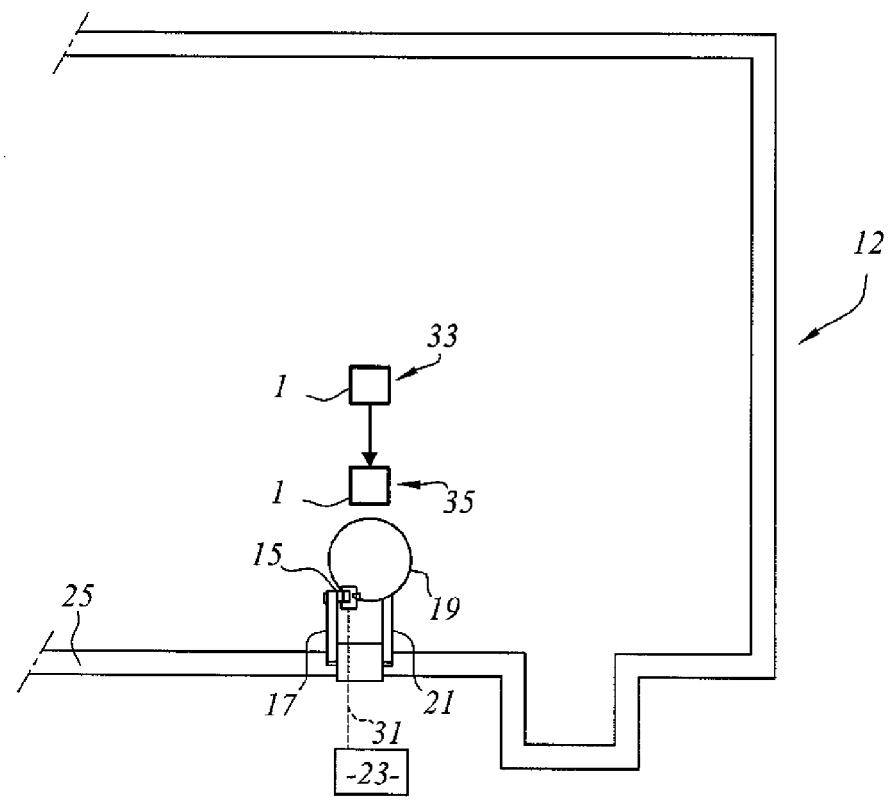
FIG. 3 is a partial diagrammatic illustration in top view of a nuclear reactor pool, in which the equipment necessary to carry out the evaluation method according to the invention has been installed.

The measurements of the shift of the grids 9 and relative rotation between the caps 5 and 7 are done, as shown in FIG. 3, on an assembly 1 arranged in a pool 12 of the nuclear reactor, for example the cooling pond of the combustible structure.

The measuring device used comprises:

a digital camera 15;

a device 17 for maintaining and adjusting the position of the camera 15;

a shielding window 19 placed on the free surface 20 of the water filling the pool 12;

means 21 for maintaining the shielding window 19 in position;

systems 23 able to control the camera 15 and process the images taken by said camera 15.

The camera 15 is a digital camera whereof the resolution is approximately 10 million pixels. The camera 15 is placed above the surface 20 of the water in the pool 12. It is not submerged.

The device 17 for maintaining the camera 15 in position is rigidly fixed to a coping 25 of the pool. It makes it possible to adjust the height of the camera 15 above the surface 20 of the water, as well as its position in a horizontal plane.

Moreover, the lens of the camera 15 faces the bottom of the pool. The device 17 makes it possible to adjust the orientation of the optical axis of the camera 15, substantially in all directions oriented towards the bottom of the pool 12.

The shielding window 19 is a circular shell made from a transparent material, for example transparent plastic such as Plexiglas®. It has a diameter of several tens of centimeters, for example 60 cm. The shielding window is placed on the surface 20 of the water, where it sinks slightly from its own weight. The bottom 27 of the shielding window 19 is positioned a few centimeters below the surface 20 of the water. The shielding window 19 also includes an upright edge 29 surrounding the bottom 27. The means 21 for maintaining the shielding window 19 in position for example include a rigid arm fixed to the coping 25 by one end and fixed to the shielding window 19 by its opposite end. This device and the slight sinking of the shielding window 19 under its own weight make it possible to avoid the oscillation (pitch, swell . . . ) of the shielding window under the effect of the waves that pass through the pool 12.

The systems 23 for example comprise a microcomputer, connected to the camera 15 by a digital line 31. The microcomputer is capable of controlling the camera 15, and in particular triggering the shots. Moreover, the microcomputer is able to control the transfer of the digital files for each image from the camera 15 to an internal memory, and to display the images on a screen so as to verify the quality thereof.

The systems 23 can comprise another microcomputer, equipped with graphic analysis means making it possible to determine the shift of the grids and the relative rotation of the caps 5, 7 from images taken by the camera 15. This computer can also be the same as the one that controls the camera 15.

The measuring device can also include projectors 24 making it possible to light the assemblies 1 during the shots.

The method for estimating the transverse shift of the grids 9 and the relative rotation of the caps 5 and 7 will be explained in detail below.

During a first step, two series of shots are taken of the assembly to be characterized, one series to estimate the shift of the grids, and the other to estimate the rotation between caps.

Figure 4:
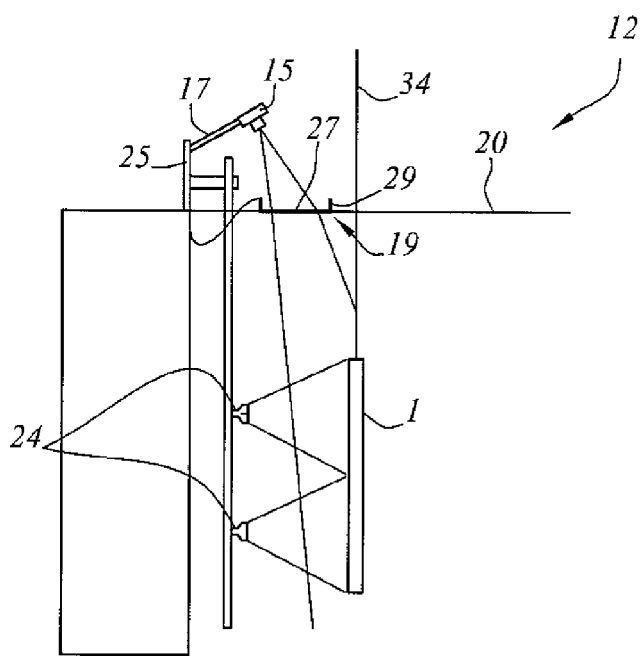
FIG. 4 is a cross-sectional view of the pool of FIG. 3, showing a fuel assembly in the position provided to measure twist.

The assembly 1 to be characterized is grasped by a bridge crane, using a handling tool, and is brought to the position 33 (see FIG. 3) provided for measuring the shift of the grids. In that position, the upper cap 5 of the assembly 1 is situated about 3 meters below the surface of the water (FIG. 4). The camera 15 and the assembly 1, in a horizontal direction, are spaced apart from each other by a distance between 1 meter and 4 meters, preferably between 2 and 3 meters.

The optical axis of the camera 15 is oriented downwards, and forms, with the vertical, an angle between 10° and 40°, preferably between 20° and 30°.

A first lateral face of the assembly faces the camera 15. The orientation of the optical axis of the camera 15 and the horizontal distance between the assembly 1 and the camera 15 are chosen so that the entire lateral face of the assembly 1 facing the camera 15 appears in the images taken by the camera 15. Moreover, as shown by FIG. 4, the position of the shielding window 19 is adjusted so that the bottom 27 of the shielding window 19 is inserted on the optical path between the camera 15 and the lateral face of the assembly 1 to be photographed.

While the images are taken, the assembly 1 remains suspended to the bridge crane by a handling tool 34.

Before taking an image of the first lateral face of the assembly, one waits for the assembly to be stabilized in the position 33, and in particular for it no longer to be animated by a swinging movement at the end of the tool 34.

Once the assembly is stabilized, an operator controls the camera 15 via the systems 23 to take an image of the first lateral face of the assembly 1.

The operator then orders the transfer of the digital file of the image to the systems 23, and views the image on the microcomputer screen. If the quality of the image is satisfactory, the nuclear fuel assembly 1 is then pivoted a quarter-turn via a bridge crane, so as to turn a second lateral face of the nuclear fuel assembly 1 towards the camera 15. The assembly 1 remains at position 33. After the assembly is stabilized, the operator controls the camera 15 to take an image of the second lateral face of the fuel assembly 1.

The same procedure can be repeated, until the camera 15 has taken at least one image of satisfactory quality of at least two adjacent lateral faces of the fuel assembly 1.

The nuclear fuel assembly 1 to be characterized is then moved, using the bridge crane, to the position 35 (see FIG. 3) provided for taking images intended to evaluate the twist of the whole assembly around its longitudinal axis.

In that position 35, the upper cap is located about 3 meters underwater. Following the horizontal direction, the distance between the camera 15 and the assembly 1 is between 50 cm and 1 m, and is for example 70 cm.

The optical axis of the camera 15 forms an angle between 1° and 10° relative to the vertical, and is for example 5°. The shielding window 19 is again arranged in a position such that the bottom 27 is inserted on the optical path between the camera 15 and the nuclear fuel assembly 1 to be characterized.

The horizontal distance between the camera 15 and the assembly 1, and the orientation of the optical axis, are chosen so that the entire lateral face of the assembly 1 facing the camera 15 appears in the images taken.

The operator takes at least one image of at least one lateral face of the nuclear fuel assembly 1, after stabilizing the assembly 1. The corresponding digital file is transferred by the digital line 31 to the systems 23, and the operator checks the quality of the image(s) on the screen.

During a second step, the digital files of the images taken are analyzed, in order to determine the shift of the grids and the relative rotation between the caps. This operation is done either on the systems 23 that control the camera 15, or on another microcomputer.

Regarding the transverse shift of the grids, the procedure is as follows.

First, an image of a first lateral face of the assembly is analyzed. As shown in FIG. 5, graphical analysis software is used to draw two longitudinal lines 37 and 39 on said face. Each of the lines 37 and 39 extends from the upper grid 9a to the lower grid 9b. The line 37 is located to the left of the first lateral face of the assembly, near the leftmost two fuel rods 3. Symmetrically, the line 39 is located to the right of the first lateral face, and passes near the rightmost two rods.

More precisely, the operator calibrates an upper end of the straight line 37 on a reference of the lateral face 11 of the upper grid 9a or fuel rods 3 close to the left end of the upper grid 9a. According to the drawing of the grid and the visibility of the various components, this reference is for example the middle of the space separating the peripheral fuel rod 3 and the immediately adjacent rod 3, or the inner edge of the peripheral rod, or the hollow of the grid vane . . . . Likewise, the lower end of the line 37 is calibrated on the equivalent reference near the left end of the lower grid 9.

The line 37 is rectilinear and extends continuously from the upper grid 9a to the lower grid 9b.

The line 39 is drawn in the same way and is calibrated on the equivalent references located near the right end of the upper and lower grids 9 of the first lateral face.

One then determines graphically, for each of the intermediate grids 9, the shift of the grid 9 to the right or left of the image relative to the line 37 and relative to the line 39. To that end, for each intermediate grid, the references 40 are used, for example as more particularly shown in FIG. 6 the ends of the inner tabs separating the cells in which the peripheral fuel rod 3 and the immediately adjacent fuel rod 3 are housed.

These references, when the fuel assembly 1 is not distorted, are all longitudinally aligned with the corresponding references of the upper grid 9a and the lower grid 9b.

In the present method, for each intermediate grid 9, the shift relative to line 37 of the reference 40 is determined. To that end, one counts, on the image of the first lateral face, the number of pixels separating the reference 40 from the line 37.

Likewise, for each intermediate grid 9, one evaluates the number of pixels separating the line 39 from the equivalent reference located near the right end of the upper and lower grids 9a, 9b of the first lateral face.

The distance between the lines 37 and 39 is also measured at each of the intermediate grids 9 and possibly at the upper and lower grids 9a, 9b, in number of pixels.

For each type of nuclear fuel assembly 1, the theoretical distance between the two lines 37 and 39 is known. Thus, for a nuclear fuel assembly having a grid of 17 rods by 17 rods, the distance between the lines 37 and 39 is 189 mm, in the event the references 40 of FIG. 6 are used. Knowing, at each grid 9, the number of pixels separating the lines 37 and 39 and the theoretical width between the two lines, it is possible to calculating the width corresponding to each pixel.

This width per pixel data makes it possible to convert, for each grid 9, the distances of the references 40 relative to the lines 37 and 39 measured in pixels, in distances estimated in millimeters.

For each grid 9, the distance measured on the first lateral face of the assembly 1 corresponds to the average between the two distances estimated above, i.e. the distance relative to the line 37 and the distance relative to the line 39.

The same procedure is repeated for an image of at least one other lateral face of the assembly, adjacent to the first.

For each grid 9, the shift estimate done based on the images of the two opposite lateral faces makes it possible to estimate the shift along the direction parallel to said two faces.

Figure 7:
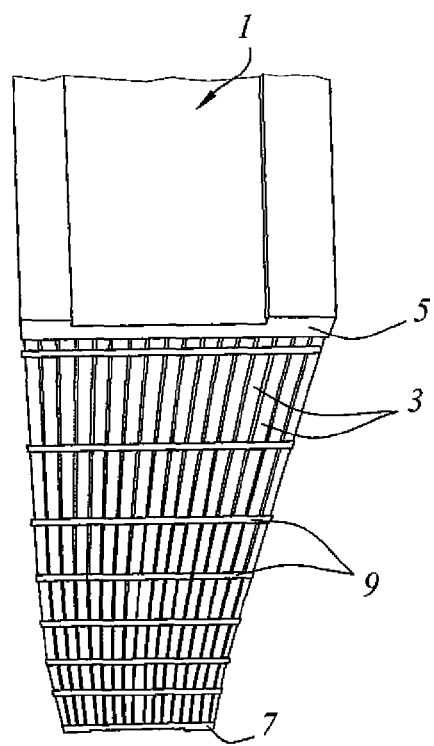
FIG. 7 is an image taken by the camera of FIG. 3, in order to determine the relative rotation of the upper and lower caps.
Figure 8:
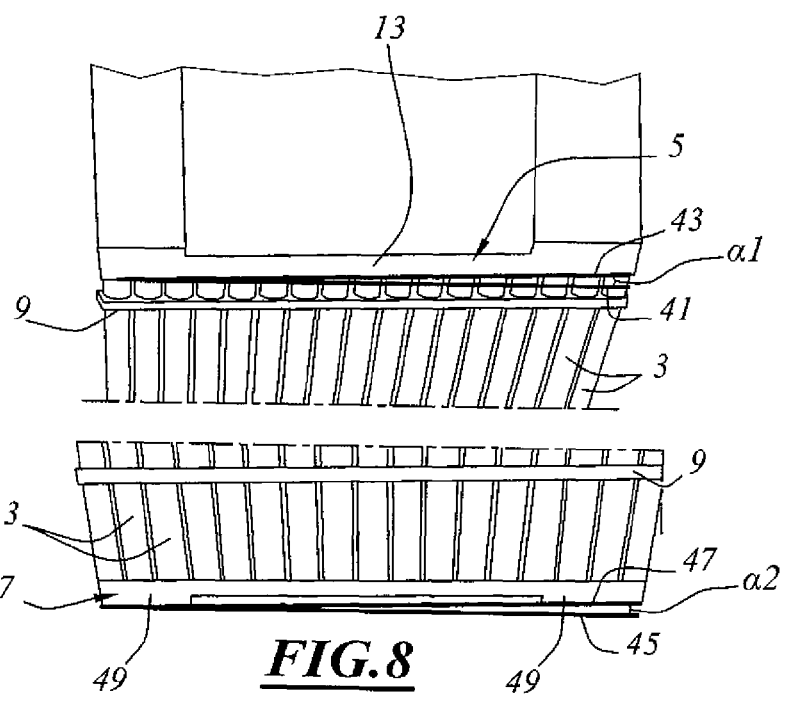
FIG. 8 is an enlarged view of the zones of FIG. 7 showing the upper and lower cap, geometric lines having been materialized in those zones in order to determine the relative angle between the two caps.

The relative rotation between the upper 5 and lower 7 caps is estimated using the procedure illustrated in FIGS. 7 and 8.

For each image, the angle between the upper cap 5 and the horizontal of the image, and the angle between the lower cap 7 and the horizontal of the image, is estimated. The twist of the fuel assembly 1 between the upper cap 5 and the lower cap 7 is obtained by calculating the difference between the two angles estimated above.

As shown in FIG. 8, a horizontal line 41 is first drawn immediately under the upper cap 5. Then, a line 43 is drawn on the face 13 of the upper cap 5 visible in the image. Typically, the line 43 is drawn along the lower edge of the face 13. The angle $\alpha 1$ is then measured between the lines 41 and 43.

Secondly, a line 45 following the horizontal of the image is drawn near the lower cap 7. A line 47 is also drawn following a geometric line characteristic of the lower cap 7. The geometric lines 43 and 47 are chosen so that, in the absence of rotation between the upper 5 and lower 7 caps, the lines 43 and 47 are parallel to each other. For example, if the geometric line 43 corresponds to the lower edge of the upper cap 5, a line can be chosen for the geometric line 47 that passes through the edges of the two feet 49 of the lower cap 7 of the fuel assembly 1. In any case, a line is chosen for the line 47 that shows up clearly enough in the image. In certain images, the upper edge of the lower cap 7 is too blurry to make it possible to draw a precise geometric line. This edge could be used if the image was very clear.

The angle $\alpha 2$ is then measured between the horizontal 45 and the geometric line 47. The rotation between the upper cap 5 and the lower cap 7 is calculated by calculating the difference between $\alpha 1$ and $\alpha 2$.

Depending on the software used, it may not be necessary to draw the horizontal lines 41 and 45; some software in fact makes it possible to obtain the angle directly from a virtual line relative to the horizontal.

The evaluation method described above has multiple advantages.

According to a first aspect, the evaluation method includes a step consisting of placing the assembly to be characterized in a volume of water, a step consisting of placing a camera outside the volume of water, above the free surface of that volume of water, and taking at least one image of at least one lateral face of the nuclear fuel assembly, and a step for graphical analysis of the image. Because the camera is not submerged, but rather remains outside the water, it is quick to place. Likewise, the equipment making it possible to place and orient it is considerably simplified. The time needed to take the images is short, such that the handling bridge for the nuclear fuel assemblies is only immobilized for a short time. In the case where the checks are done during an unloading and reloading operation of the core of a nuclear reactor, the stop period of the reactor is shortened.

The elements making it possible to maintain and orient the camera 15 are not submerged, and therefore do not have to undergo in-depth decontamination at the end of the operation. The camera is less exposed to radiation, and its lifespan is longer than that of a submerged camera moved along the assemblies to be characterized.

Using a shielding window placed on the surface of the water, and inserted in the optical path of the camera, means that the images are not disrupted by the small waves spreading on the surface of the water.

According to a second aspect of the invention, independent from the first, the invention relates to a method for evaluating a quantity characteristic of the bowing of a nuclear fuel assembly, the assembly including nuclear rods, two end maintenance grids located near opposite ends of the nuclear fuel rods, and a plurality of intermediate maintenance grids distributed between the two end maintenance grids, the method comprising:

a step for taking an image of at least two lateral faces of the nuclear fuel assembly;

for each face, a step for materialization, on the image, of at least one substantially longitudinal reference line extending from one end grid to the other end grid;

a step for determining, on the image, the transverse shift of each intermediate grid relative to the reference line.

This method can be used with a camera placed outside the volume of water, but also with a camera placed underwater. It has the advantage that it is not necessary, to evaluate the transverse shift of each grid, to use a plumb line arranged near the nuclear fuel assembly or a tape measure also arranged along the assembly.

The method is particularly precise when two reference lines are drawn on the image, one to the right and the other to the left, the two lines having a known spacing.

The use of existing visual references on the grids or on the rods and visible in the images, so as to estimate the shift relative to the reference lines, makes it possible to increase the precision of the method.

In the method, the orientation of the optical axis of the camera and the spacing between the camera and the nuclear fuel assembly are chosen so that the entire lateral face of the assembly appears in the image. This makes it possible to increase the precision of the measurement. It would be possible to take two images, for example one of the upper portion and one of the lower portion of the nuclear fuel assembly. However, this would lead to less good precision for the shift estimates.

According to a third aspect, independent of the first two, the invention relates to a method for evaluating a quantity characteristic of the twist of the fuel assembly estimated from the rotation of the upper and lower caps relative to each other around the longitudinal direction, comprising a step consisting of taking, with a camera, at least one lateral image of the nuclear fuel assembly, a step consisting of materializing, in the image, a geometric line of the upper cap and a geometric line of the lower cap, the two geometric lines normally being parallel to each other when the upper and lower caps do not have rotation relative to each other around the longitudinal direction, and a step consisting of determining, in the image, the relative angle between the two geometric lines.

This method is particularly convenient, because it is possible to use images taken by a camera placed above the volume of water of the pool where the assembly to be characterized is placed.

Orienting the optical axis of the camera along an angle between 1° and 10° relative to the vertical and placing the camera and the fuel assembly at a distance of less than 1 m in a horizontal plane, makes the entire lateral face of the fuel assembly appear in the image. The precision of the method is thus increased.

The method described above can have multiple alternatives.

To increase the precision of the method, it is possible not to limit oneself to the number of images strictly necessary to evaluate the lateral distortion of the fuel assembly 1 (a view of two adjacent lateral faces) and the twist of the whole assembly (a single image).

It is for example possible to take a first image of each of the lateral faces of the assembly 1, then a second image of each of the faces of the assembly in each of positions 33 and 35 so as to minimize the risk of having a same image problem for one of the lateral faces of the assembly. It is also possible to take more than two images per face. The distortion is then evaluated by averaging the set of shifts estimated from each of the views clear enough to be graphically analyzed. Likewise, the twist is estimated from the set of values of the angle of rotation evaluated from each of the analyzed images.

It is possible to photograph only one of the faces of the assembly, in which case the shift of the grids can only be estimated in one direction. It is also possible to photograph three or four faces.

As indicated above, it is possible, for each lateral face of the assembly, to take several partial images and not one image covering the entirety of the lateral face. This is, however, detrimental to the precision of the evaluation of the shift of the maintenance grids or of the twist.

To determine the shift of the lateral grids, it is possible to perform a graphic analysis by drawing a single line on the lateral face of the assembly. In that case, the estimate of the width of a pixel is done by calculation, taking a known dimension of the assembly as a reference, for example the total width of the grid.

The angles between the optical axis of the camera and the vertical, and the distances between the assembly 1 and the camera, can be different from those mentioned above. They depend on the characteristics of the lens used in the camera and the dimensions of the fuel assembly to be characterized.

To evaluate the shift between the grid and the longitudinal lines drawn on the lateral face of the fuel assembly, it is possible to use visual references other than those previously cited. It is for example possible to use the extreme edge of the grid, or even references placed specially on the grid to that end.

Concerning the twist measurements, it is possible to use geometric lines other than those mentioned above. Thus, for the upper cap, it is possible to materialize a line corresponding to the upper edge of the cap. For the lower cap, it is possible to materialize a line corresponding to the upper edge of the cap or the lower edge of the cap.

The camera can be a digital camera rather than a film camera.

The description of the invention was done relative to a fuel assembly intended for a light water reactor of the pressurized water reactor type. The described method is also applicable to pressurized water reactors of the VVER type (Vodaa Vodiannee Energititscherski Reactor, in English Water Water Energy Reactor) for which the hexagonal grid of the fuel assembly requires that at least three images be taken to estimate the shift of the grids: one of each of three adjacent lateral faces of the assembly perpendicular to the longitudinal direction. It is also applicable to boiling water reactors (BWR), and more generally to any underwater monitoring of a fuel assembly for a nuclear reactor.

The method described above makes it possible to estimate the shift of the grids in a transverse plane with a precision of about 2 mm in every direction. It also makes it possible to measure the twist of the assembly between the upper and lower caps with a precision of about 2°.

The invention claimed is:

1. A method for evaluating at least one quantity relative to the distortion of a nuclear fuel assembly, the method comprising the following steps:
   placing the nuclear fuel assembly in a volume of water bounded by a free upper surface;
   placing a camera outside the volume of water, above the free upper surface;
   taking at least one image of at least one lateral face of the nuclear fuel assembly with the camera while the camera is above the free upper surface of the volume of water; and
   graphically analyzing the at least one image and deducing the at least one quantity relative to the distortion of the nuclear fuel assembly therefrom.

2. The evaluation method according to claim 1 wherein the at least one image taken by the camera shows the entire lateral face of the nuclear fuel assembly.

3. The evaluation method according to claim 1 wherein the nuclear fuel assembly comprises: a plurality of longitudinally elongated nuclear fuel rods; and a plurality of grids for maintaining the nuclear fuel rods in position, the plurality of grids being distributed longitudinally along the nuclear fuel rods, the at least one quantity relative to the distortion of the nuclear fuel assembly being respective shifts of the grids in a transverse plane perpendicular to a longitudinal direction.

4. The evaluation method according to claim 3 wherein the camera has an optical axis forming an angle between 10° and 40° relative to a vertical at a time of a shot.

5. The evaluation method according to claim 3 wherein the camera and the nuclear fuel assembly are spaced apart from each other when the image is taken by a distance between 1 meter and 4 meters in a horizontal plane.

6. The evaluation method according to claim 3 wherein the nuclear fuel assembly comprises an upper and a lower maintenance grid situated near opposite ends of the nuclear fuel rods; and a plurality of intermediate maintenance grids distributed between the upper and the lower maintenance grids, wherein the step for graphic analysis comprises the following sub-steps:
   materializing, on the image, at least one substantially longitudinal reference line extending from the upper or lower maintenance grid to the other upper or lower maintenance grid; and determining, on the image, a transverse shift of each of the intermediate grids relative to the at least one reference line.

7. The evaluation method according to claim 6 wherein the upper, lower and intermediate maintenance grids or the fuel rods near the maintenance grids can have respective visual references substantially aligned longitudinally when the upper, lower and intermediate maintenance grids are not shifted transversely, the reference line passing through the visual references relative to the upper and lower maintenance grids, the transverse shift of each intermediate maintenance grid being determined by estimating, on the image, the transverse shift between the visual reference relative to the intermediate maintenance grid and the reference line.

8. The evaluation method according to claim 3 wherein at least one image is taken of each of the two lateral faces perpendicular to each other of the nuclear fuel assembly, and the respective shifts of the maintenance grids are determined in two directions perpendicular to each other and perpendicular to the longitudinal direction.

9. The evaluation method according to claim 1 wherein the nuclear fuel assembly comprises upper and lower caps, wherein the quantity relative to the distortion of the nuclear fuel assembly is the rotation of the upper and lower caps relative to each other around a longitudinal direction.

10. The evaluation method according to claim 9 wherein the camera presents an optical axis forming an angle between 1° and 10° relative to a vertical when the image is taken.

11. The evaluation method according to claim 9 wherein, when the image is taken, the camera and the nuclear fuel assembly are spaced apart from each other by a distance smaller than 1 meter in a horizontal plane.

12. The evaluation method according to claim 9 wherein the upper and lower caps have determined respective geometric lines normally parallel to each other when the upper and lower caps do not have any rotation relative to each other around the longitudinal direction, wherein the step for graphic analysis of the image comprises the following substeps:
   determining, in the image, the two geometric lines; and
   determining, in the image, a relative angle between the two geometric lines.

13. The method according to claim 1 wherein the camera has a determined optical axis, and a shielding window being placed on the free surface and inserted on the optical axis of the camera.

* * * * *